United States Patent

Nakanuma et al.

[15] 3,637,434

[45] Jan. 25, 1972

[54] VAPOR DEPOSITION APPARATUS

[72] Inventors: Sho Nakanuma; Yuichi Haneta; Keizo Fujimori; Toshio Wada, all of Tokyo, Japan

[73] Assignee: Nippon Electric Company, Limited, Tokyo, Japan

[22] Filed: Nov. 4, 1969

[21] Appl. No.: 874,002

[30] Foreign Application Priority Data

Nov. 7, 1968 Japan..................................43/81716

[52] U.S. Cl...............................117/201, 117/106, 148/175, 118/48

[51] Int. Cl.....................................C23c 13/08, B05c 11/14

[58] Field of Search........................117/201, 106 A; 118/48; 148/175

[56] References Cited

UNITED STATES PATENTS 3,424,629 1/1969 Ernst et al..............................148/175

3,511,723 5/1970 Burd....................................148/175

*Primary Examiner*—William L. Jarvis

*Attorney*—Sandoe, Hopgood and Calimafde

[57] ABSTRACT

An apparatus is provided for vapor depositing an epitaxial semiconductor layer or film on a semiconductor substrate comprising a susceptor of prismatic configuration supported along its longitudinal axis. The susceptor is confined within a housing to shield it from the external environment. A gas inlet pipe with at least one slit or orifice therealong is provided within the housing along one side of the susceptor and an outlet pipe also with at least one slit or orifice for exhausting gas substantially diametrally opposite the inlet pipe along the other side of the susceptor. The surface of the susceptor is provided with holding means for supporting semiconductor substrates. The apparatus has means for heating the susceptor and means for effecting relative axial rotation as between the pipes and the susceptor about the longitudinal axis of the susceptor. Preferably, the susceptor and pipes are rotated in mutually opposite directions.

5 Claims, 2 Drawing Figures

INVENTORS
SHO NAKANUMA
YUICHI HANETA
KEIZO FUJIMORI
TOSHIO WADA by
Sandoe, Hopgood & Calimafde
ATTORNEYS

VAPOR DEPOSITION APPARATUS

This invention relates to an apparatus for forming an epitaxial layer or insulation film on the surface of a semiconductor substrate through vapor deposition.

STATE OF THE ART

Generally, an apparatus for vapor depositing an epitaxial layer of semiconductor or insulation film of silicon oxide silicon nitride, or the like, on a semiconductor substrate comprises in introducing a reaction gas into one end of a susceptor within a chamber having disposed thereon an array of semiconductor substrates, the reaction gas being removed from the chamber at its other end. A description of such apparatus is available in the literature and is shown in particular in FIG. 14 on page 37 of the American periodical "SPC and Solid State Technology" Oct. issue, 1967.

A disadvantage of the conventional vapor deposition apparatus is that the semiconductor substrates disposed near the gas inlet and those near the outlet are exposed to different component reaction gases. As a result, the nearer the substrates are positioned with respect to the gas inlet, the thicker is the epitaxial layer or insulation film formed thereon. It has therefore been difficult to form uniform semiconductor substrates by the conventional vapor deposition apparatus.

An object of this invention is therefore to provide a vapor deposition apparatus capable of producing highly uniform semiconductor substrates having epitaxial layer or insulation film.

In order to obtain the highly uniform semiconductor substrates, it is necessary to supply uniformly the reaction gas to individual semiconductor substrates and remove it uniformly therefrom in the same condition.

Figure 1:
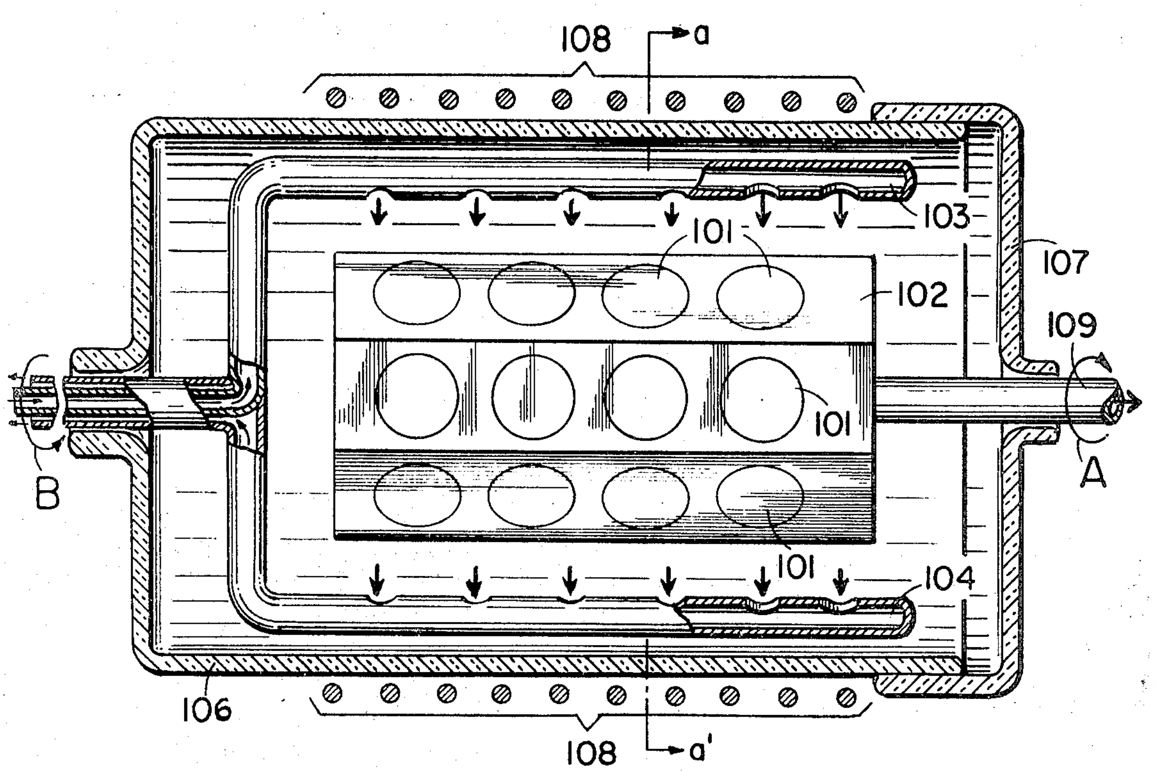
Figure 2:
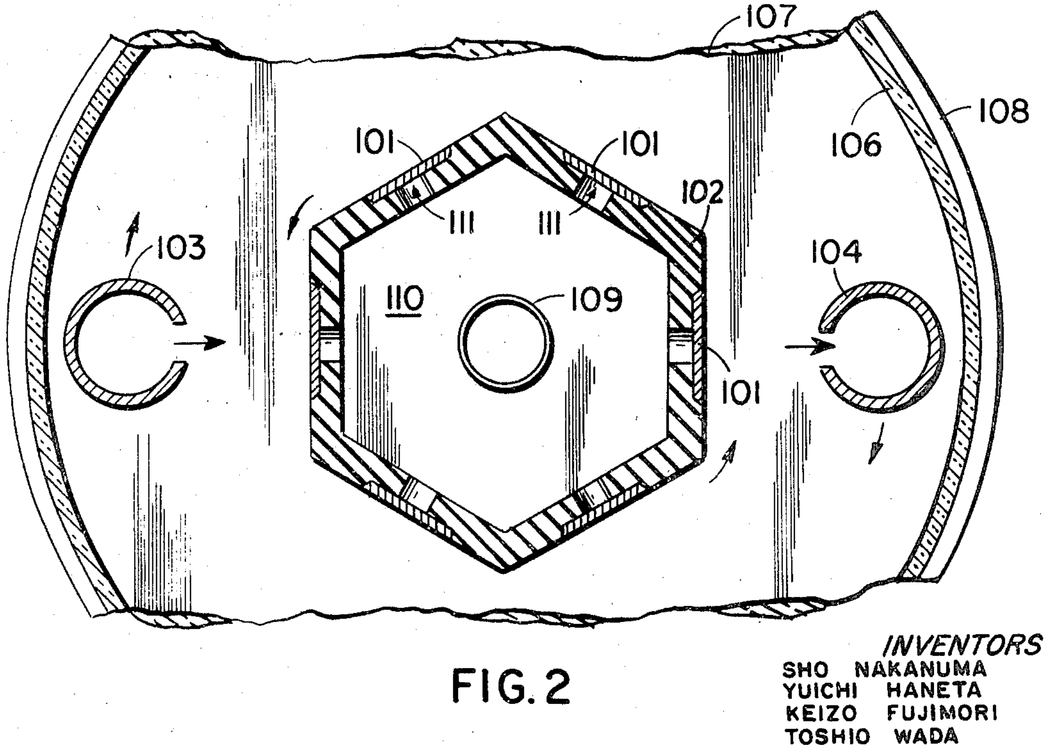

Other objects will be apparent from the following disclosure and the accompanying drawing, wherein:

FIGS. 1 and 2 illustrate one apparatus embodiment which may be employed in carrying out the invention.

STATEMENT OF THE INVENTION

According to a specific embodiment of the invention, there is provided a vapor deposition apparatus which comprises a susceptor substantially horizontally disposed and arranged so that the semiconductor substrates are held by its unidirectionally rotating cylindrical or prismatic outer surface by holding means, such as pneumatic suction, reaction gas inlet pipe and outlet pipe preferably rotated oppositely with respect to the susceptor and extending in parallel with said cylindrical outer wall which holds semiconductor substrates; an external case or housing for shielding said gas pipes from external atmosphere and for isolating the internal reaction system; and heating means surrounding the external housing or embedded in the susceptor.

In its broad aspects, the invention is directed to an apparatus for vapor depositing an epitaxial semiconductor layer on a semiconductor substrate comprising, a susceptor or prismatic configuration disposed along its longitudinal axis, holding means on the surface of said susceptor for supporting semiconductor substrates in spaced relation thereon, a gas inlet pipe disposed and spaced longitudinally along one side of the susceptor, a gas outlet pipe substantially diametrally opposite the inlet pipe disposed and spaced longitudinally along the opposite side of the susceptor, the inlet pipe having at least one slit or orifices spaced along the length thereof for supplying reaction gas to the semiconductor substrates, the outlet pipe having at least one slit or orifices for exhausting the reaction gas, a housing enclosing the pipes and said susceptor for shielding them from the external environment, means for heating the susceptor, and means for effecting relative axial rotation as between the pipes and said susceptor about the longitudinal axis of said susceptor.

The susceptor may be of general cylindrical or polygonal prismatic configuration as shown in the drawing. The term "-prismatic" configuration is meant to cover the susceptor, whether it is cylindrical or polygonal in shape.

The method aspects of the invention resides in providing a susceptor of prismatic configuration disposed along its longitudinal axis, the susceptor being confined within a housing so as to shield it from the external environment, providing a gas inlet pipe with at least one slit or orifices therealong within the housing disposed and spaced longitudinally along one side of the susceptor and an outlet pipe with at least one slit or orifices substantially diametrally opposite the inlet pipe disposed and spaced longitudinally along the opposite side of said susceptor, disposing a plurality of spaced semiconductor substrates about and integrally to the surface of the susceptor, heating the susceptor, and then feeding vapor through the inlet pipe and exhausting it through the outlet pipe, while effecting relative axial rotation as between the pipes and the susceptor about the longitudinal axis of the susceptor.

According to the vapor deposition apparatus of this invention, the reaction gas component is uniformly distributed in the reaction system, and the temperature of semiconductor substrates is kept constant in one embodiment by rotating the horizontally disposed susceptor. This, in turn, makes it possible to avoid nonuniform processing conditions and thus assure high yield of semiconductor substrates having highly uniform characteristics.

Referring now to the drawing, FIGS. 1 and 2 show a preferred embodiment of the invention, the vapor deposition apparatus being constructed in such manner that a hollow susceptor 102 is provided with means for reducing the pressure of the hollow portion and for holding semiconductor substrates 101 at openings in the external wall thereof. A reaction gas inlet pipe 103 and a reaction gas outlet pipe 104 are provided disposed in parallel with and facing the external wall of susceptor 102 which holds the semiconductor substrates 101, the inlet pipe being substantially diametrally opposite the outlet pipe. A case or housing 106 and a cover 107 are provided for shielding the gas pipes 103 and 104 and the susceptor from the external atmosphere. A high-frequency coil 108 is disposed around the case so as to inductively heat the susceptor. On the other hand, the susceptor may be resistance heated. The susceptor 102 is preferably rotated reversely with respect to the rotation of the reaction gas inlet and outlet pipes 103 and 104, whereby a uniform heating condition is established for the semiconductor substrates 101, and a uniform reaction distribution maintained with the semiconductor substrates. An outlet pipe 109 connected to a vacuum pump (not shown) is provided coupled to susceptor 102. The pressure in the hollow portion 110 of the susceptor is reduced through the pipe 109, thereby holding the semiconductor substrates 101 at absorption holes or openings 111 provided in the outer wall of susceptor 102. From the inlet pipe 103, silane gas such as $SiH_4$, $SiHCl_3$ or $SiCl_4$ is introduced into the reaction system when the epitaxial growing process is carried out. A mixture of gases such as silane, aluminum chloride, $H_2$, $O_2$, NO, $CO_2$ or the like, is introduced when the insulator deposition is to be carried out.

According to this embodiment, the reaction gas is very uniformly distributed in the reaction system shielded from external atmosphere by housing 106 and cover 107, the preferably horizontally positioned susceptor 102 and the pipes 103 and 104 rotated in opposite directions to distribute heat uniformly whereby a high yield of semiconductor substrates with highly uniform characteristics is obtained. In other words, the invention permits an ideal uniformity of the semiconductor substrates by rotating the reaction gas inlet pipe and outlet pipe and the susceptor. The arrows "A" and "B" in the drawing are to be understood schematically to indicate the means for driving the respective rotary devices in mutually opposite directions. In the above-mentioned embodiment, one of the rotating means which connects the susceptor or the pipes may be omitted to simplify the apparatus, so long as one is rotated relative to the other. The foregoing embodiment employs the high-frequency frequency heating method. Instead of this arrangement, resistant wire, such as nichrome wire may be used. This resistant wire may be embedded within the susceptor, thus dispensing with the high-frequency coil 108 as in FIG. 1. This will facilitate observation of growth condition, temperature, and other factors affecting the growth layer of the semiconductor substrates.

While a preferred embodiment of the invention has been described in detail, it should be particularly understood that the description is made by way of example and not as a limitation to the scope of the invention.

What is claimed is:

1. An apparatus for vapor depositing an epitaxial semiconductor layer on a semiconductor substrate which comprises;
   a susceptor of prismatic configuration disposed along its longitudinal axis,
   holding means on the surface of said susceptor for supporting semiconductor substrates in spaced relation thereon,
   a gas inlet pipe disposed and spaced longitudinally along one side of the susceptor,
   a gas outlet pipe substantially diametrally opposite said inlet pipe disposed and spaced longitudinally along the opposite side of said susceptor,
      said inlet pipe having at least one slit or orifices spaced along the length thereof for supplying reaction gas to said semiconductor substrates, said outlet pipe having orifices for exhausting said reaction gas,
   a housing enclosing said pipes and said susceptor for shielding them from the external environment, means for heating said susceptor, and means for effecting relative axial rotation as between the pipes and said susceptor about the longitudinal axis of said susceptor.

2. The vapor deposition apparatus of claim 1, wherein said susceptor and said inlet and outlet pipes are respectively adapted to axially rotate in mutually opposite directions.

3. The vapor deposition apparatus of claim 2, wherein the semiconductor substrates are supported in openings on the surface of the susceptor by suction.

4. A method of vapor depositing an epitaxial semiconductor layer on semiconductor substrates which comprises,
   providing a susceptor of prismatic configuration disposed along its longitudinal axis, said susceptor being confined within a housing so as to shield it from the external environment,
   providing a gas inlet pipe with at least one slit or orifices therealong within said housing disposed and spaced longitudinally along one side of said susceptor and an outlet pipe with at least one slit or orifices substantially diametrally opposite said inlet pipe disposed and spaced longitudinally along the opposite side of said susceptor,
   disposing a plurality of spaced semiconductor substrates about the surface of said susceptor,
   heating said susceptor, and feeding vapor through said inlet pipe and exhausting it through said outlet pipe, while effecting relative axial rotation as between said pipes and said susceptor about the longitudinal axis of said susceptor.

5. The method of claim 4, wherein said pipes and said susceptor are axially rotated about the said longitudinal axis in mutually opposite directions.

* * * * *